(12) United States Patent
Grover et al.

(10) Patent No.: US 12,375,268 B2
(45) Date of Patent: Jul. 29, 2025

(54) PRIVATE SECURE BLOCKCHAIN (71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 128 days.

(21) Appl. No.: 17/953,670

(22) Filed: Sep. 27, 2022

(65) Prior Publication Data
US 2024/0106631 A1 Mar. 28, 2024

(51) Int. Cl.
*H04L 9/08* (2006.01)

(52) U.S. Cl.
CPC .......... *H04L 9/0825* (2013.01); *H04L 9/085* (2013.01); *H04L 9/0866* (2013.01)

(58) Field of Classification Search
CPC ..... H04L 9/0825; H04L 9/085; H04L 9/0866; H04L 9/50
See application file for complete search history.

(56) References Cited

U.S. PATENT DOCUMENTS

| 11,243,943 B2 | 2/2022 | Bartolucci | |
|---|---|---|---|
| 2022/0166616 A1 | 5/2022 | Manevich | |
| 2023/0127913 A1* | 4/2023 | Khan | H04L 9/0822 380/28 |

FOREIGN PATENT DOCUMENTS

KR 20210080818 A * 7/2021

OTHER PUBLICATIONS

Chen et al., A secure blockchain-based group key agreement protocol for IoT, 2021. (Year: 2021).*
Gupta et al., Design of ECC based Authenticated Group Key Agreement Protocol Using Self-Certified Public Keys, 2018. (Year: 2018).*

* cited by examiner

*Primary Examiner* — Trong H Nguyen
(74) *Attorney, Agent, or Firm* — Sheridan Ross P.C.

(57) ABSTRACT

A first node in a distributed blockchain ledger validates all remaining nodes in the distributed blockchain ledger to secure the distributed blockchain ledger. The remaining nodes in the distributed blockchain ledger can be validated in various ways. For example, an encrypted package can be exchanged to obtain a unique session key for each of the remaining nodes in the distributed blockchain ledger. Another alternative is to receive split-key fragments from all the nodes in the distributed blockchain ledger. The received split-key fragments are used to generate a common key for validating all the remaining nodes in the distributed blockchain ledger.

20 Claims, 5 Drawing Sheets

PRIVATE SECURE BLOCKCHAIN

FIELD

The disclosure relates generally to blockchains and particularly to securing private blockchains.

BACKGROUND

With traditional blockchains like those used in Bitcoin, because the nodes on the distributed blockchain ledger are very large and the blockchain is public, the need to verify the authenticity each of the nodes in the distributed blockchain ledger is not an issue. This is because the number of nodes required to do a consensus attack on the distributed blockchain ledger cannot be reasonably achieved because of the large number of nodes in the blockchain. For example, in a ten thousand node distributed blockchain ledger, an attack would require an additional ten thousand and one nodes to compromise the blockchain.

Today, blockchains are being used in a large number of instances where the size of the distributed blockchain ledger is much smaller (e.g., ten nodes). In addition, the data stored in the distributed blockchain ledger may be highly sensitive and needs to be secure. It is much easier to attack a small distributed blockchain ledger. For example, a distributed blockchain ledger of ten nodes would only require eleven malicious nodes to compromise using traditional blockchain voting processes.

SUMMARY

These and other needs are addressed by the various embodiments and configurations of the present disclosure. The present disclosure can provide a number of advantages depending on the particular configuration. These and other advantages will be apparent from the disclosure contained herein.

A first node in a distributed blockchain ledger validates all remaining nodes in the distributed blockchain ledger to secure the distributed blockchain ledger. The remaining nodes in the distributed blockchain ledger can be validated in various ways. For example, an encrypted package can be exchanged to obtain a unique session key for each of the remaining nodes in the distributed blockchain ledger. Another alternative is to receive split-key fragments from all the nodes in the distributed blockchain ledger. The received split-key fragments are used to generate a common key for validating all the remaining nodes in the distributed blockchain ledger.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a Merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the Merkle tree of all transactions (or information or data) in the block, the current time, and the difficulty level. The nonce can be stored in an extraNonce field, which is stored as the left most leaf node in the Merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the Merkle tree, as the transaction or other information is the left most leaf node. The body of the block contains the transactions or other information. These are hashed only indirectly through the Merkle root.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
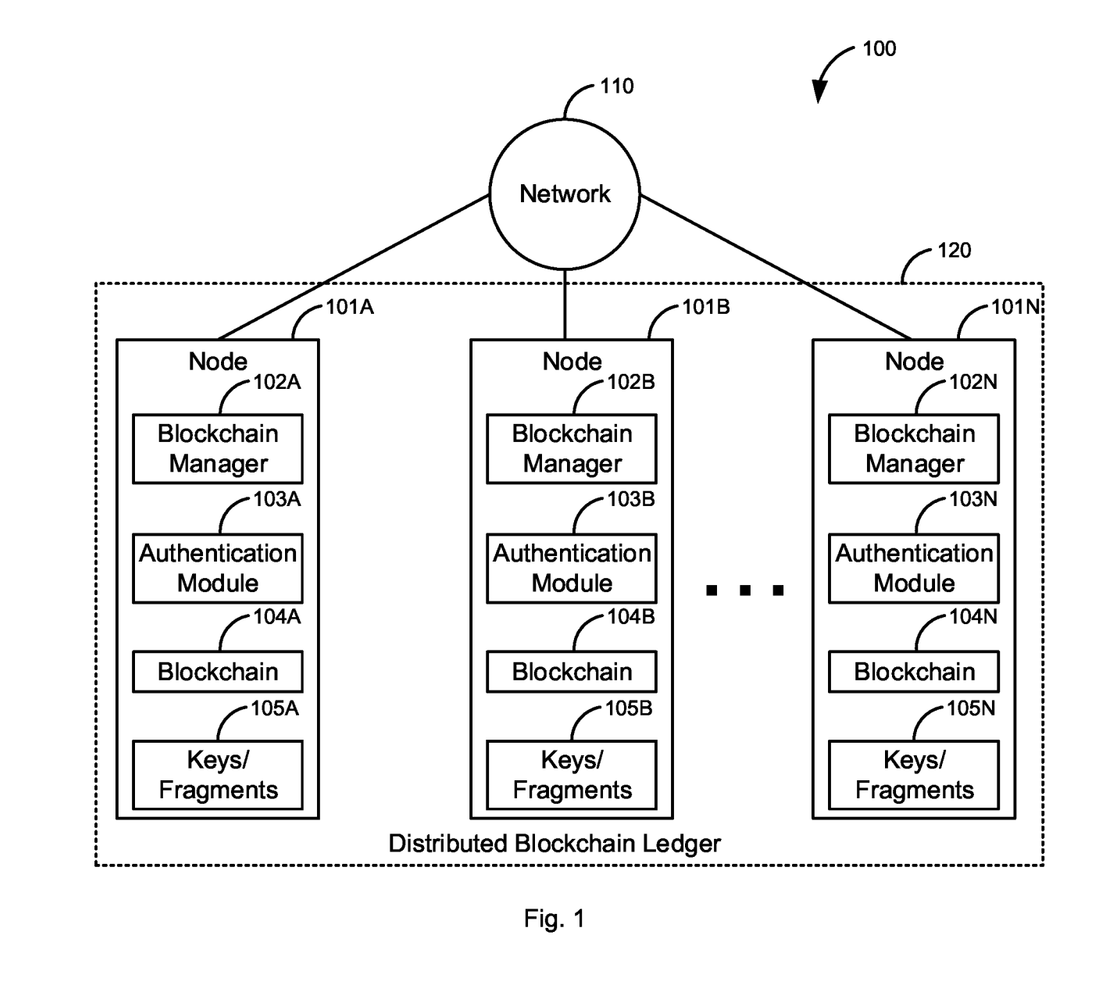
FIG. 1 is a block diagram of a first illustrative system for providing a private secure blockchain.

FIG. 1 is a block diagram of a first illustrative system 100 for providing a private secure blockchain 104. The first illustrative system 100 comprises nodes 101A-101N, a network 110, and a distributed blockchain ledger 120.

The nodes 101A-101N can be or may include any communication device that can communicate on the network 110, such as a Personal Computer (PC), a server, an embedded device, and/or the like. As shown in FIG. 1, any number of nodes 101A-101N may be connected to the network 110. The nodes 101A-101N comprise the digital blockchain ledger 120.

The nodes 101A-101N further comprise blockchain managers 102A-102N, authentication modules 103A-103N, blockchains 104A-104N, and keys/fragments 105A-105N. The blockchain managers 102A-102N manage the blockchains 104A-104N. The blockchain managers 102A-102N also manage adding new blocks to the blockchains 104A-104N.

The authentication modules 103A-103N manage security for each of the nodes 101A-101N in the distributed blockchain ledger 120. The authentication modules 103A-103N use various protocols to determine that the other nodes 101 in the distributed blockchain ledger 120 are authenticated/valid nodes 101.

The blockchain 104A-104N in the distributed blockchain ledger 120 are copies of the same blockchain 104. When a new block is added to the blockchains 104A-104N the blockchain managers 102A-102N manage the addition of the new block to the blockchains 104A-104N.

The keys/fragments 105A-105N are used by the authentication module 103 to validate the other nodes 101 in the distributed ledger 120. The keys/fragments 105A-105N may be used to establish a secure connection between the nodes 101A-101N in the distributed blockchain ledger 120.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The digital blockchain ledger 120 comprises the nodes 101A-101N. The digital blockchain ledger 120 is used to replicate the blockchains 104A-104N in the distributed blockchain ledger 120.

Figure 2:
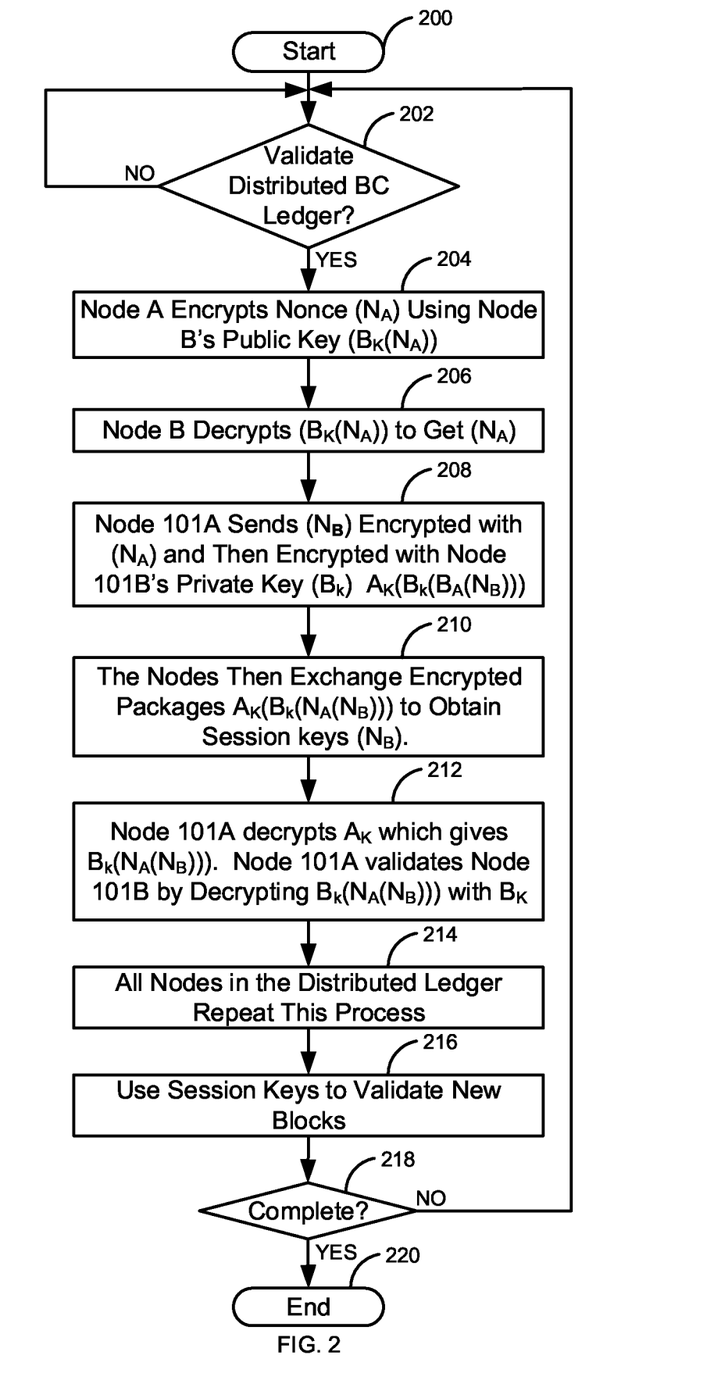
FIG. 2 is a flow diagram of a validation process for securing a private blockchain using keys.

FIG. 2 is a flow diagram of a validation process for securing a private blockchain 104 using keys. Illustratively, the nodes 101A-101N, the blockchain managers 102A-102N, the authentication modules 103A-103N, and the distributed blockchain ledger 120 are stored-program-controlled entities, such as a computer or microprocessor, which performs the method of FIGS. 2-5 and the processes described herein by executing program instructions stored in a computer readable storage medium, such as a memory (i.e., a computer memory, a hard disk, and/or the like). Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

In FIG. 2, the nodes 101A-101N use a consensus process based on Private/Public Key Infrastructure (PKI). In this process, each node 101 is validated by the other nodes 101 in the distributed blockchain ledger 120. Each of the nodes 101A-101N have a private key 105 and the public keys 105 of each of the other nodes 101 in the distributed blockchain ledger 120. For example, node 101A validates nodes 101B/ 101N. Likewise, node 101B validates nodes 101A/101N and node 101N validates nodes 101A/101B.

The process starts in step 200. The process determines, in step 202, if there is a need to validate the distributed blockchain ledger 120. The need to validate the distributed blockchain ledger 120 may be based on a periodic period, based on adding a new block to the blockchains 104A-104N, based on an event, and/or the like. If it is determined to not validate the distributed blockchain ledger 120, in step 202, the process of step 202 repeats.

FIG. 2 is used to illustrate the initial exchange between node 101A and node 101B. If there is a need to validate the distributed blockchain ledger 120, in step 202, the authentication module 103A encrypts a nonce ($N_A$) with node 101B's public key ($B_K(N_A)$) in step 204. The encryption module 104B decrypts ($B_K(N_A)$) to get $N_A$ in step 206. The node 101B then encrypts nonce ($N_B$) with the nonce ($N_A$) previously sent from the node 101A and then is encrypted with node 101B's private key ($B_k$) and finally encrypted with node 101A's public key ($A_K$) in step 208. This gives the following: $A_K(B_k(N_A(N_B)))$. The nodes then exchange encrypted packages $A_K(B_k(N_A(N_B)))$ to obtain session keys ($N_B$) in step 210. That is, node 101A decrypts $A_K$ with $A_k$ which gives $B_k(N_A(N_B))$. Node 101A validates Node 101B by decrypting $B_k(N_A(N_B)))$ with $B_K$. Since node 101A knows $N_A$ it can decrypt $N_A(N_B)$ to provide the session/ secret key $N_B$ in step 212. The session key 105 can be used to protect and validate new blocks that are being added to the blockchains 104A-104N.

All the remaining nodes 101 in the distributed ledger repeat the above process in step 214. For example, using FIG. 1, node 101B validates nodes 101N and node 101N validates nodes 101A/101B. The session keys 105 are then used to then validate new blocks that are being added to the blockchains 104A-104N in step 216.

The process then determines, in step 218, if the process is complete. If the process is not complete in step 218, the process goes back to step 202. Otherwise, the process ends in step 220.

Figure 3:
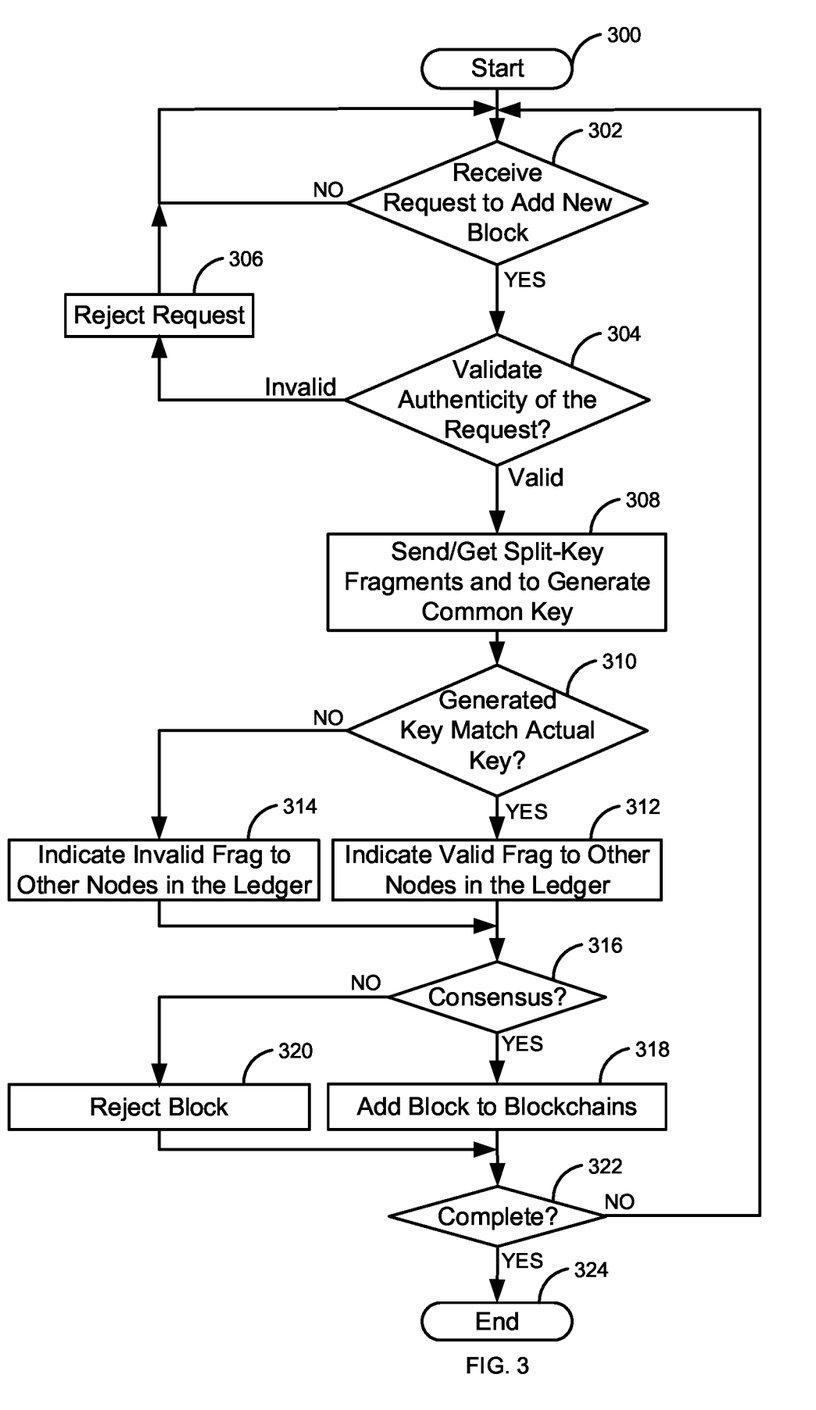
FIG. 3 is a flow diagram of a validation processes for securing a private blockchain using split-key fragments.

FIG. 3 is a flow diagram of a validation processes for securing a private blockchain 104 using split-key fragments. Split-key fragments can be generated using known key fragmenting algorithms, such as, Micali encryption (see Fair Public-Key Cryptosystems, Silvio Micali, 1993 Laboratory for Computer Science, Massachusetts Institute of Technology, 545 Technology Square, Cambridge MA 02139), Multiparty Computation (see https://www.hypr.com/key-splitting/#:~: text=Splitting%2C%20or%20key%20splitting%2C%20is, part%20is%20intercepted%20and%20analyzed), and/or the like. Each of these references are incorporated herein by reference.

To generate split-key fragments (e.g., using Micali encryption), a common key is split into a defined number of split-key fragments. For example, using FIG. 1 where there are three nodes 101A-101N, using the common key, five split-key fragments are created by dividing the common key into five equal split-key fragments. At least three of the five split-key fragments are needed to regenerate the common key (i.e., a majority of the split-key fragments) using the split-key algorithm. The remaining two split-key fragments may be used for adding additional nodes 101 later on if needed.

The process starts in step 300. Each of the nodes 101A-101N wait for a request to add a new block to the blockchains 104A-104N in step 302. If a request to add a new block to the blockchains 104A-104N is not received in step 302, the process of step 302 repeats.

Otherwise, if a request to add a new block to the blockchains 104A-104N is received in step 302, the authenticity of the request is validated. For example, the request to add the block to the blockchains 104A-104N in the distributed blockchain ledger 120 may have a digital certificate of the user who wants to add the new block to the blockchains 104A-104N in the distributed ledger 120. In one embodiment, the request of step 302 may be from one on the nodes 101 and can have the node's split-key fragment. The authentication modules 103A-103N validates the authenticity of the request in step 304. If the authenticity of the request is not validated in step 304 (e.g., rejected by any of the nodes 101A-101N or a majority of the nodes 101A-101N), the request is rejected in step 306 and the process goes back to step 302.

Otherwise, if the request is valid in step 304, the authentication modules 103A-103N send/get their split-key fragments in step 308. For example, using FIG. 1, the node 101A would send its split-key fragment to nodes 101B/101N. Likewise, node 101B would send its split-key fragment to nodes 101A/101N and node 101N would send it split-key fragment to nodes 101A/101B. Each of the nodes 101A-101N generate the common key using the received split-key fragments in step 308. The common key may also be generated using the node's own split-key fragment. For example, in FIG. 1, the split-key fragments for each of the nodes 101A-101N (three split-key fragments) would be used to regenerate the common key in step 308.

The authentication modules 103A-103N determine if the generated common key actually matches the actual common key in step 310. If the generated common key does not match the actual common key in step 310, the node 101 indicates that there is an invalid fragment to the other nodes 101 in the distributed blockchain leger 120. Otherwise, if the generated common key is valid in step 310, the node 101 indicates to the other nodes 101 that the authentication of the other nodes 101 in the distributed blockchain ledger 120 is valid in step 312. The nodes 101A-101N determine if there is a consensus in step 316. For example, did each of the nodes 101A-101N generate the actual common key (or a majority) in step 310? If there is a consensus in step 316, the block is added to the blockchains 104A-104N in step 318. Otherwise, the block is rejected in step 320.

The process determines, in step 322, if the process is complete. If the process is not complete in step 322, the process goes to step 302. Otherwise, the process ends in step 324.

Although not shown in FIG. 3, the process authenticating all the nodes 101A-101N in the distributed blockchain ledger 120 may be started based on other events than adding a block to the blockchains 104A-104N. For example, the authentication of all the nodes 101A-101N in the distributed blockchain ledger 120 may be based on a time period, or another event.

If the generated common key does not match the actual common key in step 310, the nodes 101A-101N may be able to identify the node 101 that provided an invalid split-key fragment. If there are more than m nodes (where m is a minimum number of nodes 101), a process of sorting through the split-key fragments can be used to identify the node 101 that provided the invalid voting split-key fragment. For example, suppose node 101A is the only one of eleven nodes that provided an invalid voting split-key fragment (the other 10 nodes 101 provided valid split-key fragments), thus m=6. Each node 101 can remove one of the split-key fragments and then try to generate the common key. This process is repeated until the common key is generated without one of the split-key fragments. Thus, the node 101 that provided the invalid split-key fragment is identified as a potentially malicious node 101 by all the other nodes 101 in the distributed blockchain ledger 120. The potentially malicious node 101 may be removed from the list of valid nodes. This makes for a secure distributed blockchain ledger 120 where each node 101A-101N in the distributed blockchain ledger 120 is confirmed as a trusted node 101.

In addition, the process can check to see if two or more nodes 101 have provided the same split-key fragment. If duplicate split-key fragments are detected, the nodes who provided the same split-key fragment can be flagged as potentially malicious nodes.

A node registration process may be used to add new nodes to 101 the distributed blockchain ledger 120. For example, each node 101 may keep a list of registered nodes. When a new node 101 registers, the new node must provide a valid split-key fragment. The validation process works similar to the regular consensus process/authentication process where the new node's voting split-key fragment is validated with the consensus process. Once validated by all the nodes 101A-101N in the distributed blockchain ledger 120, the nodes 101A-101N allow the new node 101 to be a member of the distributed blockchain ledger 120. A node 101 may also ask to be removed from the distributed blockchain ledger 120 by providing its split-key fragment.

In another embodiment, a node 101 may have more than one split-key fragment. In some embodiments, a secondary authentication split-key fragment may be shared (e.g., node 101A has fragments A & B and node 101B has fragments B & C.

Figure 4:
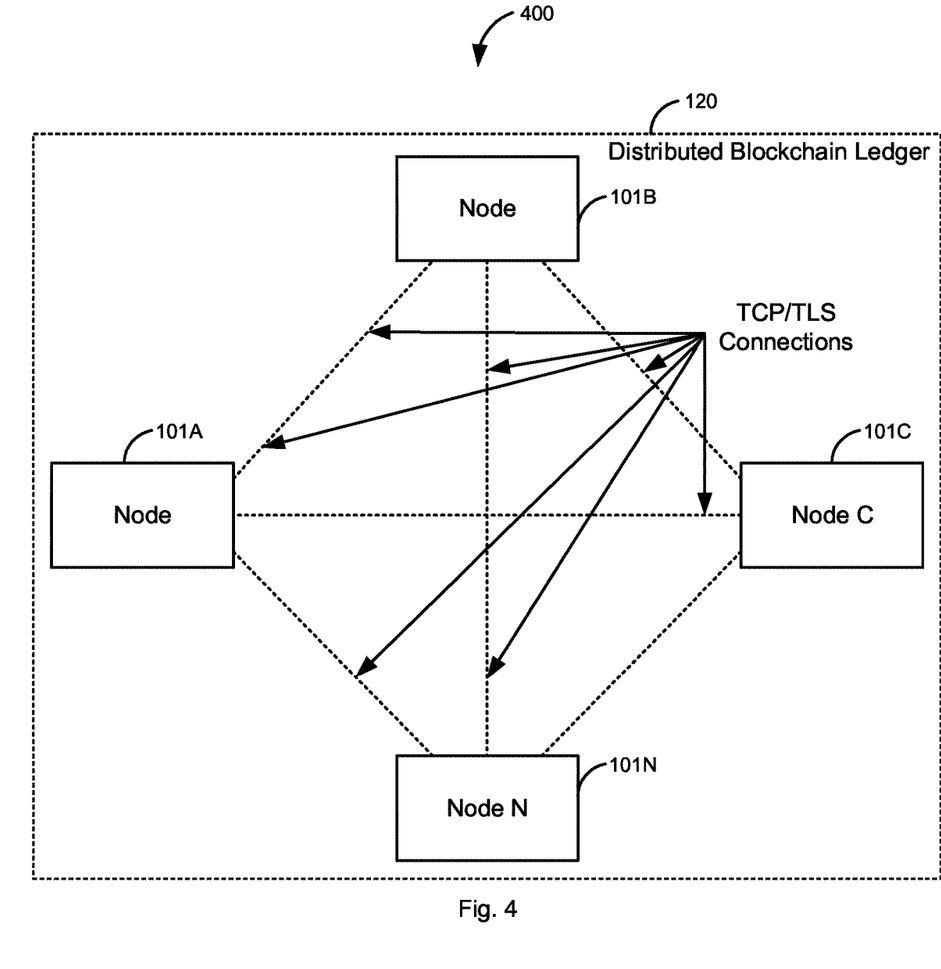
FIG. 4 is a block diagram of a distributed blockchain ledger that does not require a consensus to add a new block.

FIG. 4 is a block diagram of a distributed blockchain ledger 120 that does not require a consensus to add a new block. Each node 101A-101N in the distributed blockchain ledger 120 makes a secure connection (e.g., using Secure Sockets Layer (SSL), Transport Layer Security (TLS), or the like) to the other nodes in the distributed blockchain leger 120 (i.e., a full mesh network 400). Each node 101A-101N then authenticates using its authentication PKI process and/or split-key fragment process as described above in FIGS. 3-4. The nodes 101A-101N of the distributed blockchain ledger 120 then validate each other to ensure that all the nodes 101A-101N in the distributed blockchain ledger 120 are authentic nodes 101. Once all the nodes 101A-101N in the distributed blockchain ledger 120 are connected and authenticated using the secure connections (i.e., encrypted connections), then any node 101A-101N can add new blocks for the duration of the full mesh connection without requiring either a consensus protocol or a problem solving/puzzle solving algorithm. For example, if node 101A wants to add a new block to the blockchains 104A-104N in the distributed blockchain ledger 120, node 101A sends the request to nodes B-N. The nodes 101B-101N then add the new block to their respective blockchain 104B-104N and acknowledge the addition of the new block to node 101A.

In one embodiment, the full mesh Transmission Control Protocol (TCP)/TLS connection may be a permanent secure connection. If a node 101 goes down or is not available, other nodes 101 in the distributed blockchain ledger 120 can add new blocks as long as there is a minimum number of active nodes 101. If a node 101 later becomes active in the full mesh network, the node 101 can then authenticate and be notified of the updates and add the new block(s) that were added while the node 101 was down. If a new node 101 wants to join the distributed blockchain ledger 120, the new node 101 can join the full mesh connection by using its PKI/authentication split-key fragment like described above. In the PKI embodiment, each of the nodes 101A-101N would have to have the public key of the new node 101 in order to authenticate the new node 101.

In the embodiments described above, a split-key fragment may be tied to other information, such as a MAC address, an IP address, an authentication by a user, and/or the like. For example, the split-key fragment can be tied to authentication levels where, in addition to providing the split-key fragment, the user must authenticate at an authentication level before getting access to encryption keys to unencrypt data in the blockchains 104A-104N.

All the processes described herein can work with authentication levels. In other words, there are different sets of authentication split-key fragments/PKI authentication keys for each authentication level. Transactions for adding new blocks to the blockchains 104A-104N may require different authentication levels with a different split-keys fragments/keys based on the transaction. For example, if a first transaction required level one authentication (e.g., providing a username/password), the request to add the transaction block for the first transaction would include a split-key fragment for level one authentication. Likewise, if a second transaction required level two authentication, (e.g., providing a username/password/SMS code), the request to add the block for the second transaction would include a split-key fragment for level two authentication. The second level authentication may allow transactions for both level one and level two authentications (e.g., both level split-key fragments may be provided). An authentication service may provide a credential for the authentication level, which is then used to provide the appropriate split-key fragment. The nodes 101A-101N of the distributed blockchain ledger 120 would then verify that the provided split-key fragment is appropriate level for the transaction.

The process could work as a secure blockchain 104 as a service (e.g., a cloud service). This allows the use of the distributed blockchain ledger 120 to be used by multiple tenants in a cloud service.

Another advantage of the authentication processes described herein is that the traditional method of solving a difficult computing problem/puzzle for blockchains 104 (i.e., those used in traditional blockchains 104) is not required. Since this reduces the necessary computing power, it not only improves the efficiency of the blockchains 104A-104N in the distributed blockchain ledger 120, but the solution can also be considered a green alternative to traditional blockchains 104 because it consumes less energy.

Figure 5:
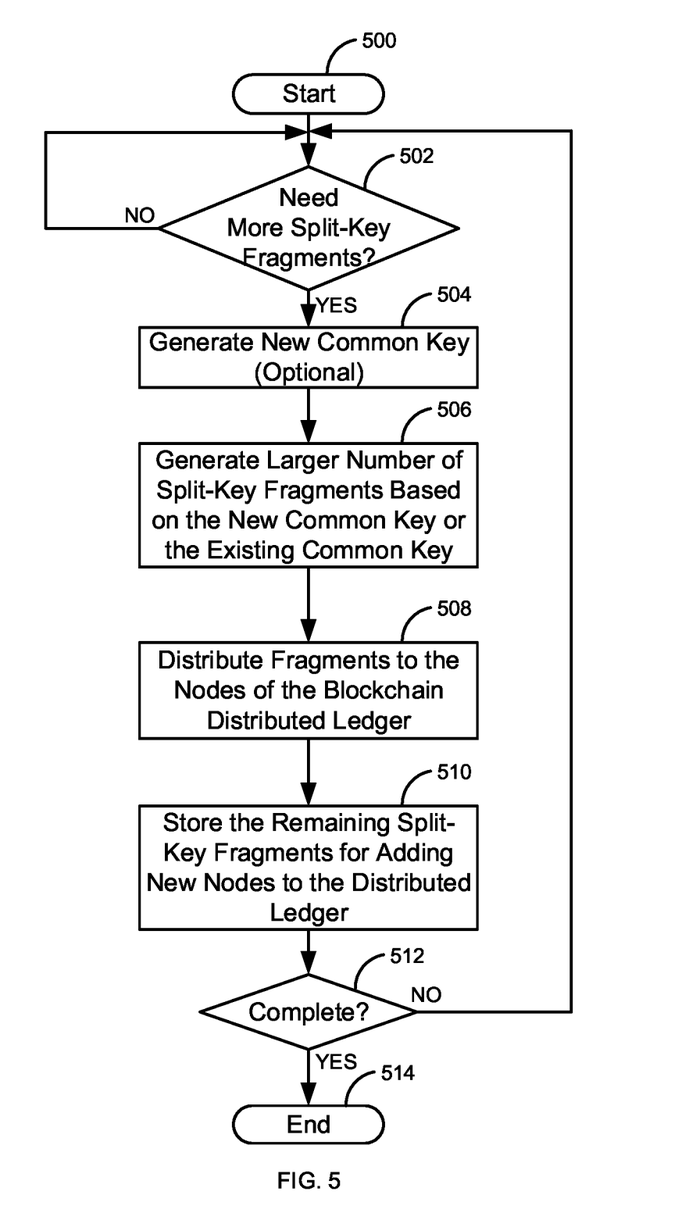
FIG. 5 is a flow diagram of a process for generating more split-key fragments for adding new nodes to a distributed blockchain ledger.

FIG. 5 is a flow diagram of a process for generating more split-key fragments for adding new nodes 101 to a distributed blockchain ledger 120. The process starts in step 500. The process determines, in step 502, if more split-key fragments are needed. For example, if all the split-key fragments are being used by the nodes 101A-101N and additional node(s) 101 need to be added to the distributed blockchain ledger 120, there would be a need to add more split-key fragments in step 502. If there is not a need to add additional split-key fragments in step 502, the process of step 502 repeats.

Otherwise, if there is a need for more split-key fragments in step 502, a new common key may be optionally generated in step 504. The new common key may be larger than the previous common key. A larger number of split-key fragments is generated based on the newly generated common key of step 504. If a new common key is not generated in step 504, in one embodiment, the existing split-key fragments may be sub-divided into smaller split-key fragments in step 506. Alternatively, the existing common key may be divided differently in step 506. The new split-key fragments are then distributed to the nodes 101A-101N of the distributed blockchain ledger 120 in step 508. Any remaining split-key fragments are stored for adding any new nodes 101 to the distributed blockchain ledger 120 in step 510.

The process then determines, in step 512, if the process is complete. If the process is not complete in step 512, the process goes back to step 502. Otherwise, the process ends in step 514.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for securing a distributed blockchain ledger comprising:
   a microprocessor; and
   a computer readable medium, coupled with the microprocessor and comprising microprocessor readable and executable instructions that, when executed by the microprocessor, cause the microprocessor to:
      validate all nodes in the distributed blockchain ledger to secure the distributed blockchain ledger, wherein the validating all the nodes in the distributed blockchain ledger comprises at least one of:
         exchanging, by all nodes in the distributed blockchain ledger, an encrypted package to obtain a unique session key for each of the nodes in the distributed blockchain ledger; and
         receiving, by all nodes in the distributed blockchain ledger, split-key fragments from all the nodes in the distributed blockchain ledger and generating, by all nodes in the distributed blockchain ledger, a common key for validating all the nodes in the distributed blockchain ledger using the received split-key fragments;
      determine that there are not enough split-key fragments to add a new node to the distributed blockchain ledger;
      in response to the determining that there are not enough split-key fragments to add the new node to the distributed blockchain ledger, regenerate split-key fragments where there are additional split-key fragments; and
      distribute the regenerated split-key fragments to all the nodes in the distributed blockchain ledger.

2. The system of claim 1, wherein the validating all the nodes in the distributed blockchain ledger comprises the exchanging the encrypted package to obtain the unique session key for each of the nodes in the distributed blockchain ledger.

3. The system of claim 1, wherein the microprocessor readable and executable instructions further cause the microprocessor to:
   receive a request to add the new node to the distributed blockchain ledger, wherein the request to add the new node to the distributed blockchain ledger comprises a new split-key fragment.

4. The system of claim 1, wherein all the nodes in the distributed blockchain ledger validate each other.

5. The system of claim 4, wherein all the nodes in the distributed blockchain ledger establish secure connections based on all the nodes in the distributed blockchain ledger validating each other and wherein new blocks are added to the distributed blockchain ledger without using a consensus protocol.

6. The system of claim 1, wherein the microprocessor readable and executable instructions further cause the microprocessor to add a new block to the distributed blockchain ledger based on a first node in the distributed blockchain ledger validating all the nodes in the distributed blockchain ledger.

7. The system of claim 1, wherein a first authentication level is associated with the exchanged encrypted package and/or the received split-key fragments and wherein a second authentication level is associated with a second exchanged encrypted package and/or second split-key fragments.

8. The system of claim 1, wherein none of the nodes in the distributed blockchain ledger use a problem-solving algorithm or puzzle solving algorithm.

9. A method for securing a distributed blockchain ledger comprising:
   validating all nodes in the distributed blockchain ledger to secure the distributed blockchain ledger, wherein the validating all the nodes in the distributed blockchain ledger comprises at least one of:
      exchanging, by all nodes in the distributed blockchain ledger, an encrypted package to obtain a unique session key for each of the nodes in the distributed blockchain ledger; and
      receiving, by all nodes in the distributed blockchain ledger, split-key fragments from all the nodes in the distributed blockchain ledger and generating, by all nodes in the distributed blockchain ledger, a common key for validating all the nodes in the distributed blockchain ledger using the received split-key fragments;
   determining that there are not enough split-key fragments to add a new node to the distributed blockchain ledger;
   in response to the determining that there are not enough split-key fragments to add the new node to the distributed blockchain ledger, regenerating split-key fragments where there are additional split-key fragments; and
   distributing the regenerated split-key fragments to all the nodes in the distributed blockchain ledger.

10. The method of claim 9, wherein the validating all the nodes in the distributed blockchain ledger comprises the exchanging the encrypted package to obtain the unique session key for each of the nodes in the distributed blockchain ledger.

11. The method of claim 9, further comprising:
   receiving a request to add the new node to the distributed blockchain ledger, wherein the request to add the new node to the distributed blockchain ledger comprises a new split-key fragment.

12. The method of claim 9, wherein all the nodes in the distributed blockchain ledger validate each other.

13. The method of claim 12, wherein all the nodes in the distributed blockchain ledger establish secure connections based on all the nodes in the distributed blockchain ledger validating each other and wherein new blocks are added to the distributed blockchain ledger without using a consensus protocol.

14. The method of claim 9, further comprising adding a new block to the distributed blockchain ledger based on a first node in the distributed blockchain ledger validating all the nodes in the distributed blockchain ledger.

15. The method of claim 9, wherein a first authentication level is associated with the exchanged encrypted package and/or the received split-key fragments and wherein a second authentication level is associated with a second exchanged encrypted package and/or second split-key fragments.

16. A computer-readable memory device having stored thereon instructions that cause a processor to execute a method for securing a distributed blockchain ledger, the method comprising:
   validating all nodes in the distributed blockchain ledger to secure the distributed blockchain ledger, wherein the validating all the nodes in the distributed blockchain ledger comprises at least one of:
      exchanging, by all nodes in the distributed blockchain ledger, an encrypted package to obtain a unique session key for each of the nodes in the distributed blockchain ledger; and
      receiving, by all nodes in the distributed blockchain ledger, split-key fragments from all the nodes in the distributed blockchain ledger and generating, by all nodes in the distributed blockchain ledger, a common key for validating all the nodes in the distributed blockchain ledger using the received split-key fragments;
   determining that there are not enough split-key fragments to add a new node to the distributed blockchain ledger;
   in response to the determining that there are not enough split-key fragments to add the new node to the distributed blockchain ledger, regenerating split-key fragments where there are additional split-key fragments; and
   distributing the regenerated split-key fragments to all the nodes in the distributed blockchain ledger.

17. The computer-readable memory device of claim 16, wherein the validating all the nodes in the distributed blockchain ledger comprises the exchanging the encrypted package to obtain the unique session key for each of the nodes in the distributed blockchain ledger.

18. The computer-readable memory device of claim 16, wherein the method further comprises: receiving a request to add the new node to the distributed blockchain ledger, wherein the request to add the new node to the distributed blockchain ledger comprises a new split-key fragment.

19. The computer-readable memory device of claim 16, wherein all the nodes in the distributed blockchain ledger validate each other and wherein all the nodes in the distributed blockchain ledger establish secure connections based on all the nodes in the distributed blockchain ledger validating each other and wherein new blocks are added to the distributed blockchain ledger without using a consensus protocol.

20. The computer-readable memory device of claim 16, wherein the method further comprises adding a new block to the distributed blockchain ledger based on a first node in the distributed blockchain ledger validating all the nodes in the distributed blockchain ledger.

\* \* \* \* \*